(12) United States Patent
Somohano et al.

(10) Patent No.: US 9,697,172 B1
(45) Date of Patent: Jul. 4, 2017

(54) VIRTUAL NETWORK OPTIMIZING A PHYSICAL NETWORK

(71) Applicant: Juniper Network, Inc., Sunnyvale, CA (US)

(72) Inventors: Pilar Somohano, Franklin, MA (US);
Brian P. O'Sullivan, Folsom, CA (US);
Hal L. Stern, Livingston, NJ (US);
Michael Yip, Wellesley, MA (US);
Aleksey L. Mints, Campbell, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 325 days.

(21) Appl. No.: 13/730,094

(22) Filed: Dec. 28, 2012

(51) Int. Cl.
*G06F 15/177* (2006.01)
*G06F 9/455* (2006.01)
*H04L 12/24* (2006.01)

(52) U.S. Cl.
CPC ............ *G06F 15/177* (2013.01); *G06F 9/455* (2013.01); *H04L 12/24* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,862,564 B1* | 3/2005 | Shue et al. | ....................... | 703/25 |
| 7,555,421 B1* | 6/2009 | Beckett | ............... | G06F 9/45537 703/23 |
| 2004/0122645 A1* | 6/2004 | Shevenell | ............... | H04L 43/50 703/21 |
| 2004/0199370 A1* | 10/2004 | Arama et al. | ..................... | 703/20 |
| 2007/0067351 A1* | 3/2007 | Singh | ................ | G06F 17/30286 |
| 2008/0043627 A1* | 2/2008 | Singh et al. | .................. | 370/241 |
| 2008/0155537 A1 | 6/2008 | Dinda et al. | | |
| 2008/0270104 A1* | 10/2008 | Stratton et al. | ................. | 703/23 |
| 2010/0229180 A1* | 9/2010 | Masuda | ........................ | 718/105 |
| 2011/0093251 A1 | 4/2011 | Belgaied et al. | | |

(Continued)

FOREIGN PATENT DOCUMENTS

EP      2 530 887 A1      12/2012

OTHER PUBLICATIONS

European Search Report corresponding to EP 13199556.5 mailed Apr. 8, 2014, 8 pages.

(Continued)

*Primary Examiner* — Chris Parry
*Assistant Examiner* — Caroline Jahnige
(74) *Attorney, Agent, or Firm* — Harrity & Harrity, LLP (57) ABSTRACT

One or more devices are configured to receive information regarding network devices associated with a physical network. The one or more devices are configured further to generate configuration data based on the information regarding the network devices. The one or more devices are configured further to generate a virtual network based on the configuration data. The one or more devices are configured to send information regarding the virtual network to a client device. The one or more devices are configured to receive a change to the virtual network from the client device; and cause a change, corresponding to the change in the virtual network, to occur in the physical network.

20 Claims, 10 Drawing Sheets

(56) References Cited

U.S. PATENT DOCUMENTS

2013/0297769 A1* 11/2013 Chang ................ G06F 9/45558
  709/224
2014/0068053 A1* 3/2014 Ravi .................... G06F 9/5072
  709/224

OTHER PUBLICATIONS

Zhang Dong, "Reconfigurable Network Simulation Testbed Based on Network Virtualization", Wireless Communications, Networking and Mobile Computing (WICOM), 2012 $8^{th}$ International Conference on, IEEE, Sep. 21, 2012, pp. 1-4, XP032342858, DOI: 10.1109/WICOM.2012.6478637, ISBN: 978-1-61284-684-2.

Ines Houidi et al., "A Distributed and Autonomic Virtual Network Mapping Framework", Autonomic and Autonomous Systems, 2008 ICAS 2008, Fourth International Conference on, IEEE, Piscataway, NJ, USA, Mar. 16, 2008, pp. 241-247, XP031242952, ISBN: 978-0-7695-3093-2.

* cited by examiner

VIRTUAL NETWORK OPTIMIZING A PHYSICAL NETWORK

BACKGROUND

A physical network may include different types of network devices that are used to transfer information from one location within the physical network to another location within the physical network. The different types of network devices may include routers, switches, bridges, and/or other types of network devices.

SUMMARY

According to some example implementations, one or more devices may receive information regarding network devices associated with a physical network; generate configuration data based on the information regarding the network devices; generate a virtual network based on the configuration data, where the virtual network may emulate the physical network; send information regarding the virtual network to a client device; receive a change to the virtual network from the client device; and cause a change, corresponding to the change in the virtual network, to occur in the physical network.

According to some example implementations, a method, performed by a device, may include receiving information regarding network devices associated with a physical network; generating configuration data based on the information regarding the network devices; generating a virtual network based on the network configuration data, where the virtual network may emulate the physical network and where the virtual network may be implemented using virtual machines that are connected as a data center; sending information regarding the virtual network to a client device; receiving a change to the virtual network from the client device; and causing a change, corresponding to the change in the virtual network, to occur in the physical network.

According to some example implementations, a computer-readable medium may include a group of instructions which, when executed by one or more processors of one or more devices, cause the one or more processors to receive information regarding network devices associated with a physical network; generate a virtual network based on the information regarding the network devices, where the virtual network may emulate the physical network and where the virtual network being implemented using virtual machines; send information regarding the virtual network to a client device; receive a change to the virtual network from the client device; and cause a change, corresponding to the change in the virtual network, to occur in the physical network.

BRIEF DESCRIPTION OF DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

An implementation, described herein, may permit a virtual machine manager server (referred to as "VMM server") to receive information regarding a physical network and generate a virtual network based on the information regarding the physical network. Any changes made to the virtual network may be received by the VMM server and the VMM server may cause the changes to occur in the physical network.

Figure 1:
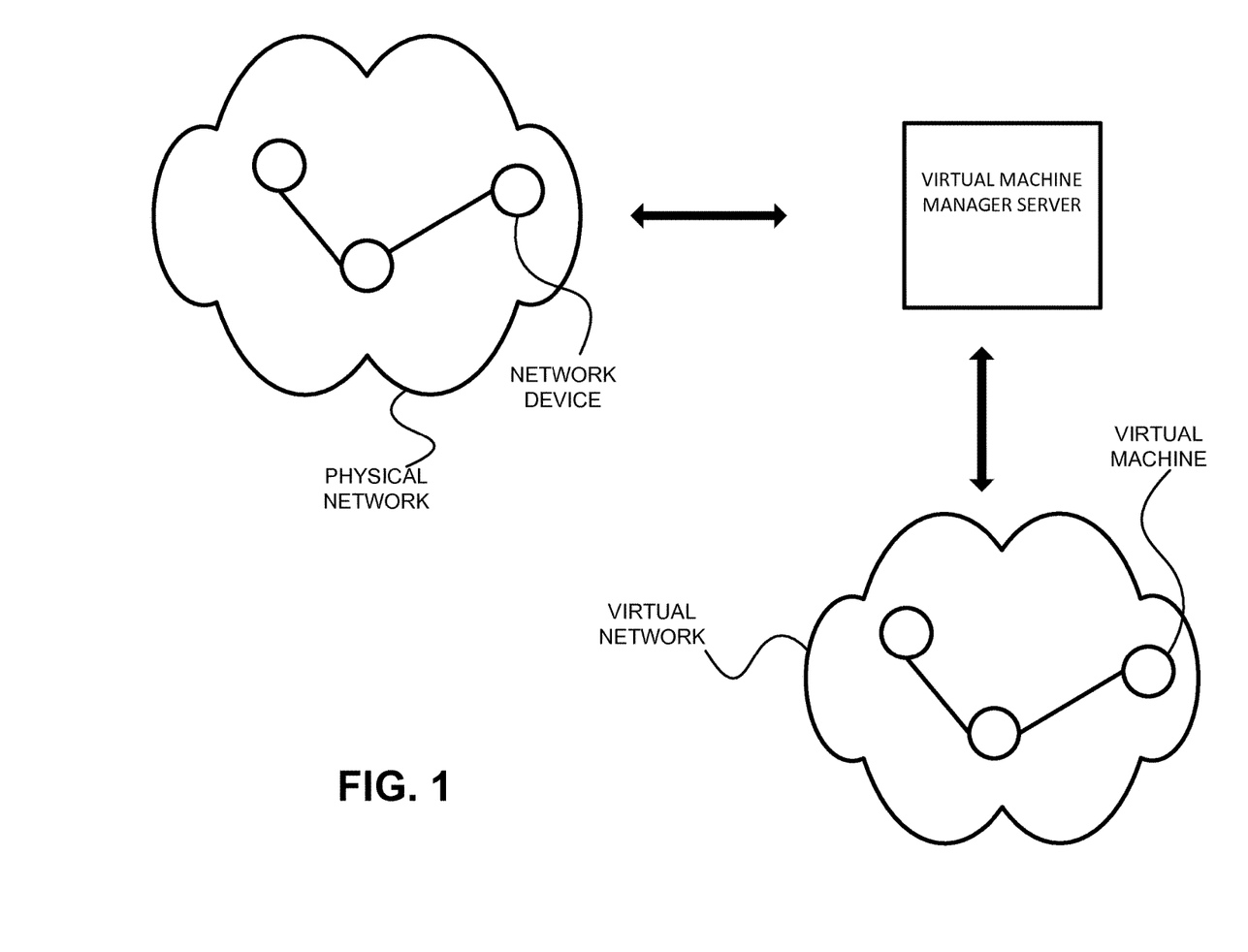
FIG. 1 is a diagram of an overview of an implementation described herein.

FIG. 1 is a diagram of an overview of an implementation described herein. As shown in FIG. 1, a VMM server is communicating with a physical network. The VMM server may receive information regarding a topology of a physical network and network devices operating within the physical network. The VMM server may use virtual machines in a virtual machine data center (referred to as "VM data center" and not shown in FIG. 1) to create a virtual network based on the information regarding the topology of the physical network and the network devices. The virtual network may emulate the physical network. The VMM server may send the information associated with the virtual network to a client device. The client device may obtain access to the virtual network (and the virtual machines in the virtual network) via a secure tunnel link. The VMM server may provide a visual representation of the virtual network to a user of the client device. The visual representation of the virtual network may permit the user to make changes to the virtual machines in the virtual network. The user may make changes (e.g., change a network device or a connection between network devices) to the virtual machines in the virtual network via the client device. The VMM server may implement these changes by changing the physical network based on the information (received from the client device) regarding the changes to the virtual network.

By creating a virtual network and permitting the user to make changes to the virtual network, the user may be able to determine how the changes may affect a virtual network (which is a virtual representation of the physical network) before implementing the changes within the physical network. This may permit the user to simulate changes to the physical network, such as simulating how to correct a problem within the physical network; simulating the effect of replacing one network device with another network device; simulating the effect of adding or removing network devices; simulating the effect of adding, disabling, or removing a connection between network devices; and/or another type of change that may be made within the virtual network before changing the physical network.

Figure 2:
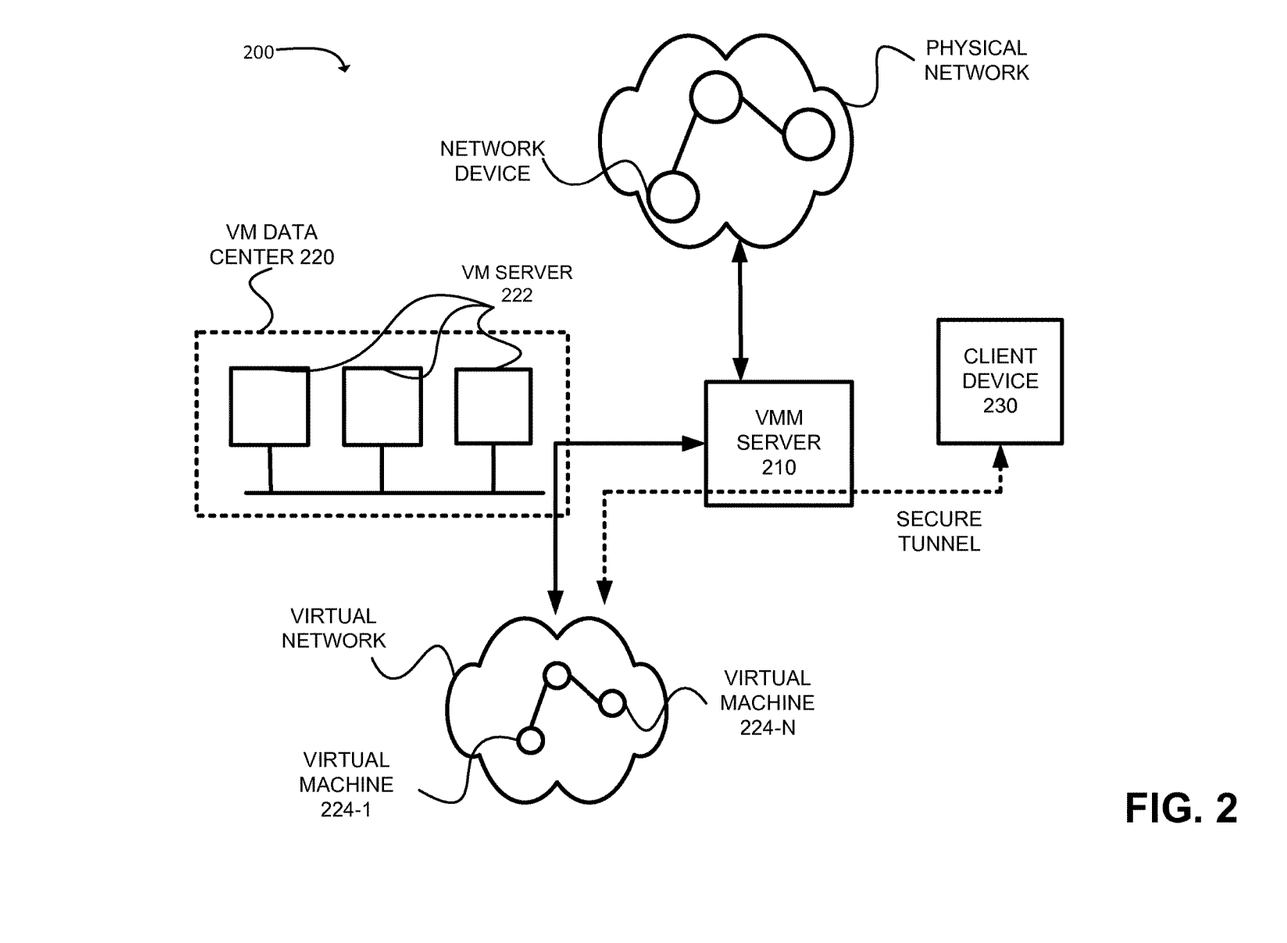
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a VMM server 210, a VM data center 220, and a client device 230. Additionally, as shown in environment 200, VMM server 210 may be connected to a physical network.

The physical network may include one or more networks, such as a wide area network (WAN), a local area network (LAN), a metropolitan network (MAN), a cellular network or a combination of networks. The physical network may include one or more network devices, such as a switching device, a routing device, a gateway device, a bridging device, a firewall device, a server device, a data acceleration device, a data aggregation device, an access point device, an analysis device, a measurement device, or the like. While the physical network in FIG. 2 is shown with three network devices, in practice, the physical network may have additional network devices.

VMM server 210 may include one or more server devices. In one example implementation where VMM server 210 includes multiple server devices, the multiple server devices may be co-located. In another example implementation where VMM server 210 includes multiple server devices, one or more of the multiple server devices may be remotely located.

VMM server 210 may create a virtual network using VM data center 220. VMM server 210 may receive information from the physical network via an interface associated with a network management system (in VMM server 210) that may provide network management services by monitoring (e.g., monitoring network traffic flow, monitoring network security, etc.) the physical network and may make changes to the physical network (e.g., change a protocol, a policy, an interface, etc.) based on managing the operation of the physical network. The network management system may send the information (from the physical network) to a virtual machine manager system in VMM server 210 that interacts with VM data center 220 to create the virtual network using virtual machines 224. The network management system may be stored by one server device associated with VMM server 210 and the virtual manager system may be stored by another server device associated with VMM server 210.

VMM server 210 VM data center 220 may include one more VM servers 222 that are used by VMM server 210 to create a virtual network. In some implementations, VM server 222, within VM data center 220, may be connected to each other VM server 222 within VM data center 220. In some example implementations, each VM server 222 may be connected to fewer than each other VM server 222. VM server 222 may connect to another VM server 222 via an Ethernet connection, an optical connection, a wireless connection, or another type of connection. While FIG. 2 shows three VM servers 222, VM data center 220 may have a smaller, or a greater, quantity of VM servers 222. Additionally, VM servers 222 may directly connect with other VM servers 222 within VM data center 220.

In some implementations, VMM server 210 may be implemented as a VM server 222, or a collection of VM servers 222, within VM data center 220. For example, a VM server 222, or a collection of VM servers 222, may perform the functions described as being performed by VMM server 210.

VM server 222 may include one or more virtual machines 224-1 . . . 224-N(N≥1) (referred to generally as "virtual machines 224" and individually as "virtual machine 224") Virtual machine 224 may be configured to emulate a network device or one or more functions of a network device within the physical network. Virtual machine 224 may be connected to other virtual machines 224 by using a virtual distributed Ethernet or another type of connection.

Client device 230 may include one or more devices. For example, client device 230 may include a personal computer, a laptop, a server, a workstation, a mobile device, and/or any other type of device capable of communicating with a network. In some implementations, VMM server 210 and client device 230 may be the same device. Client device may request information associated with the virtual network (and the virtual machines 224), from VMM server 210, via a secure communication tunnel.

The example quantity and configuration of devices illustrated in FIG. 2 are provided for simplicity. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
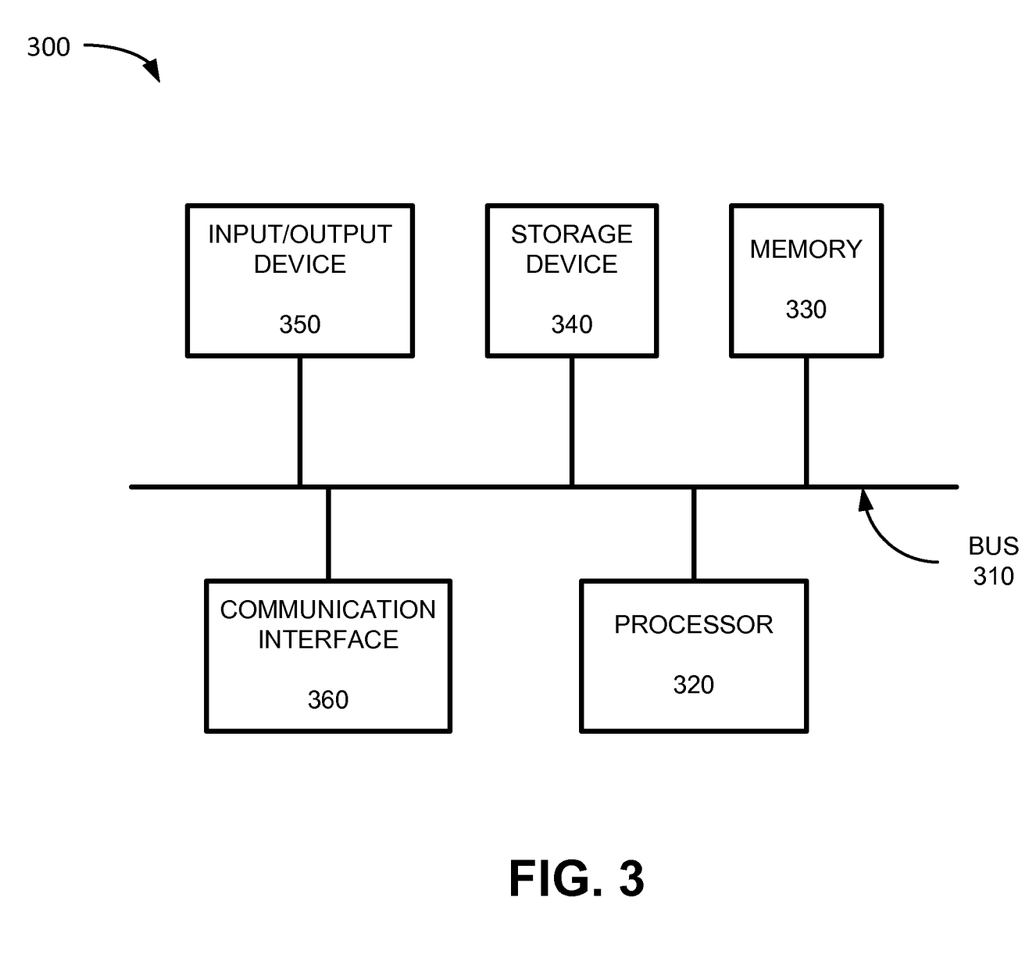
FIG. 3 is a diagram of example components of one or more devices of FIG. 2.

FIG. 3 is a diagram illustrating example components of a device 300. Device 300 may correspond to one or more of the devices illustrated in FIG. 2. For example, VMM server 210, VM data center 220, VM server 222, and/or client device 230 may include one or more devices 300 and/or one or more components of device 300.

As shown in FIG. 3, device 300 may include a bus 310, a processor 320, a memory 330, a storage device 340, an input/output device 350, and a communication interface 360. Bus 310 may include a path, or a collection of paths, that permits communication among the components of device 300.

Processor 320 may include a processor, a microprocessor, an application specific integrated circuit (ASIC), a field programmable gate array (FPGA), or another type of processing component that interprets and executes instructions. Memory 330 may include a random access memory (RAM) or another type of dynamic storage device that stores information and/or instructions for execution by processor 320; a read only memory (ROM) or another type of static storage device that stores static information and/or instructions for use by processor 320; and/or another type of memory, such as a hard drive, a cache, or a flash memory. Storage device 340 may include a recording medium to store data that may be used by processor 320.

Input/output device 350 may include a component that permits an operator to input information to device 300, such as a button, a keyboard, a keypad, a touch screen display, or the like; and/or a component that outputs information to the operator, such as a light emitting diode (LED), a display, a speaker, or the like.

Communication interface 360 may include any transceiver-like component that enables device 300 to communicate with other devices and/or systems. For example, communication interface 360 may include a separate transmitter and receiver, or a transceiver that combines the functionality of both a transmitter and a receiver. Communication interface 360 may include a wired interface, a wireless interface, or both a wired interface and a wireless interface.

Device 300 may perform certain operations, as described in detail below. According to an example implementation, device 300 may perform these operations in response to processor 320 executing sequences of instructions contained in a computer-readable medium, such as memory 330. A computer-readable medium may be defined as a non-transitory memory device. A memory device may include memory space within a single physical storage device or spread across multiple physical storage devices.

The software instructions may be read into memory 330 from another computer-readable medium, such as storage device 340, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

While FIG. 3 shows device 300 as having a particular quantity and arrangement of components, in some implementations, device 300 may include additional components, fewer components, different components, or differently-arranged components.

Figure 4:
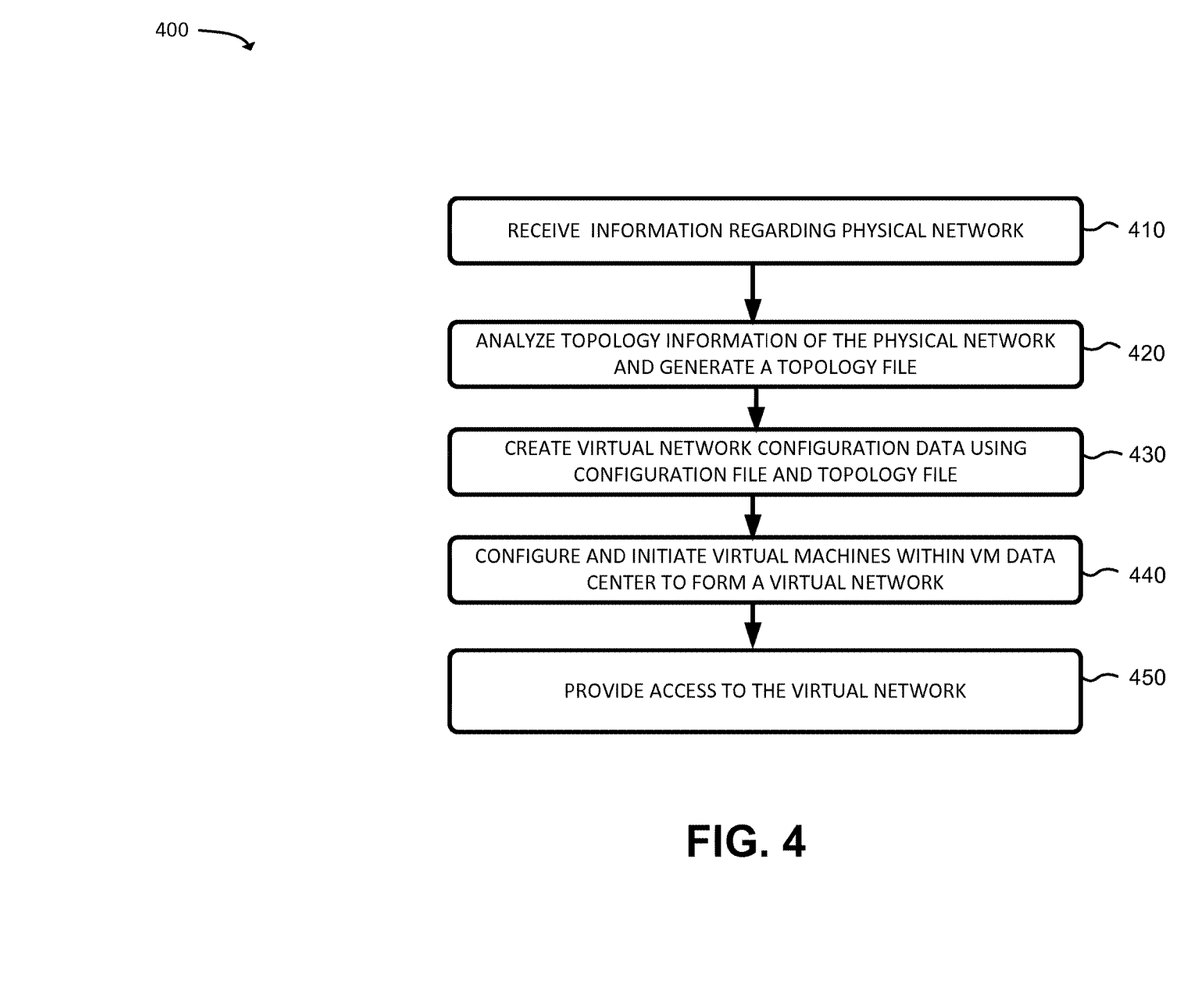
FIG. 4 is a flow chart of an example process for creating a virtual network.

FIG. 4 is a flow chart of an example process 400 for creating a virtual network. In one example implementation, process 400 may be performed by VMM server 210. In another example implementation, one or more blocks of process 400 may be performed by one or more other devices, such as VM server 222 and/or client device 230.

Process 400 may include receiving information regarding a physical network (block 410). For example, VMM server 210 may receive information regarding one or more network devices within a physical network. VMM server 210 may receive the information based on requesting the information from the physical network. The request may be based on VMM server 210 receiving instructions from a user of client device 230 and/or VMM server 210 to request the information from the physical network. Alternatively, the request may be based on VMM server 210 being configured to periodically request information (e.g., request information every hour, every three hours, every six hours, etc.) from the physical network.

VMM server 210 may communicate with a network device within the physical network. VMM server 210 may have an interface that communicates with the network device. The network device may be configured with an interface that permits the network device to communicate with VMM server 210.

The network device may receive the request for information from VMM server 210 and may send a configuration file (e.g., a text file, a binary file, a HTML file, etc.) to VMM server 210. The configuration file may include information regarding a protocol (e.g., open shortest path first (OSPF), border gateway protocol (BGP), etc.), a service (e.g. firewall, network area translation (NAT), etc.), a policy (e.g. a routing policy associated with forwarding table information), an interface type (e.g., Ethernet, 1G Ethernet, 10G Ethernet, etc.), a chassis configuration (e.g., a card, a port, an interface type, a rack, etc.), connectivity information to other network devices (e.g., which port is used to connect to another network device), quality of service (QoS) information, and/or other information regarding the network device or the physical network. The network device may be associated with an identifier. The network device may send its identifier information to VMM server 210. VMM server 210 may store the configuration file (as described above) with the network device's identifier as the information regarding the physical network.

In some example implementations, VMM server 210 may translate the information, received from the physical network, so that the information may be used by VMM server 210 and/or virtual machines 224 to generate the virtual network.

VMM server 210 may receive topology information regarding the physical network. The topology information may be associated with connectivity information associated with all of the network devices within the physical network. The topology information may include information regarding the type and/or function of network device (e.g., a router, a bridge, a switch, etc.) and the identifier information for the network device within the physical network.

In some implementations, VMM server 210 may receive a configuration file from the network device that is incompatible with the virtual machine type supported by VMM server 210. In these cases, VMM server 210 may provide the user with options to reconfigure the interface, of the network device, to permit the network device to send the configuration file information. Alternatively, VMM server 210 may maintain the interface of the non-compatible network device and may not make any changes to the network device.

In some implementations, VMM server 210 may automatically determine the course of action regarding a non-compatible network device. In some implementations, VMM server 210 may receive instructions (e.g., via client device 230) regarding the course of taken to be taken regarding a non-compatible network device.

Process 400 may include analyzing the topology information of the physical network and generating a topology file (block 420). For example, VMM server 210 may analyze the topology information received from the physical network (described with regard to block 410).

VMM server 210 may analyze connections between different network devices within the physical network. VMM server 210 may analyze port information, associated with a network device, and determine whether any of the network device's ports are being used to connect to other network devices. The port information may be associated with a physical port, a logical port, a virtual port, and/or another type of port. The network device may have multiple ports that permit the network device to connect to multiple other network devices. VMM server 210 may generate a topology file that includes the connections between different network devices within the physical network.

Process 400 may include creating virtual network configuration data using the configuration file and the topology file (block 430). For example, VMM server 210 may create virtual network configuration data by using the configuration file and/or other information for each network device in the physical network and the connections to the network devices provided in the topology file. The virtual network configuration data may include the topology of the physical network and the configuration file information (e.g., interfaces, policies, protocols, etc., as described with regard to block 410) for network devices in the physical network.

Process 400 may include configuring and initiating virtual machines within a VM data center to form a virtual network (block 440). For example, VMM server 210 may interact with VM data center 220 to configure and initiate one or more virtual machines 224 implemented by one or more VM servers 222 within VM data center 220. In some implementations, VMM server 210 may communicate with a VM server 222 of VM data center 220, via an application programming interface (API) or another type of interface.

In some implementations, VMM server 210 may send the virtual network configuration data to VM data center 220. VM data center 220 may receive the virtual network configuration data and determine which VM servers 222 are to be configured with the virtual network configuration data. VM data center 220 may allocate the number of VM servers 222 based on the amount of information (e.g., the amount of memory associated with the virtual network configuration data) and the amount of memory capacity of a VM server 222.

One or more VM servers 222 may receive the virtual network configuration data and may configure one or more virtual machines 224 based on the virtual network configuration data. One or more virtual machines 224 may be configured so that the one or more virtual machines 224 may function in the same manner as one or more network devices operating within the physical network.

In some implementations, multiple virtual machines 224 may be configured to emulate different functions of a single network device in the physical network. For example, a first virtual machine 224 may be configured with the protocol information for the network device and a second virtual machine 224 may be configured with the network device's routing policy information. In this situation, the first and second virtual machines 224 may operate together to emulate the network device.

In some implementations, one or more virtual machines 224 may use the same control plane (e.g., control plane software) used by the network devices in the physical network. Having the same control plane software may permit virtual machine 224 to have the same routing functions (and/or other functions) as the network devices in the physical network. The control plane may be configured by using the virtual network configuration data.

In some implementations, one or more virtual machines 224 may be replicated and/or stored by one or more virtual servers 222. In some implementations, the topology (or part of the topology) may be replicated and/or stored by one or more virtual servers 222. In some implementations, virtual machine 224 may be configured to execute applications being used by other virtual machines 224, virtual servers 222, network devices, and/or other devices.

Virtual machine 224 may also be configured to communicate with other virtual machines 224 in the same manner that the network device communicates with other network devices. For example, a first router in the physical network may connect to a second router, and the second router may connect to a third router. A first virtual machine 224 may be configured to emulate the first router, a second virtual machine 224 may be configured to emulate the second router, and a third virtual machine 224 may be configured to emulate the third router. Thus, the first virtual machine 224 may communicate with the second virtual machine 224 and the second virtual machine 224 may communicate with the third virtual machine 224.

With one or more virtual machines 224 configured by using the virtual network configuration data, VM data center 220 may send information regarding the configured virtual machines 224 to VMM server 210. VMM server 210 may initiate virtual machines 224 by sending commands to virtual machines 224 and/or VM servers 222. By initiating multiple virtual machines 224, VMM server 210 may generate a virtual network. The virtual network (with the virtual machines 224) may have the same configuration as the physical network and may function in the same manner as the physical network. In some implementations, the virtual network may emulate the data plane of the physical network.

VMM server 210 may store information regarding the virtual network. If the information regarding the virtual network is associated with a request by a user of client device 230, VMM server 210 may store the information along with an identifier associated with the user of client device 230. VMM server 210 may store multiple copies of the virtual network. VMM server 210 may be configured to automatically create multiple copies of the virtual network, or VMM server 210 may be requested by the user of client device 230 to create multiple copies of the virtual network.

Process 400 may include providing access to the virtual network (block 450). For example, VMM server 210 may provide client device 230 access to the virtual network. A user, using client device 230, may request information (e.g., by using a hypertext transfer protocol secure (HTTPS) address and/or another type of address associated with the virtual network) from VMM server 210. Additionally, the user, using client device 230, may request information for a particular virtual machine 224 (that may have its own address and that corresponds to a part of the physical network) within the virtual network. Client device 230 may receive the information and display the information regarding the virtual network to a user of client device 230. The information may be associated with a visual representation of the virtual network. The visual representation may include graphical information, textual information, and/or other information describing the virtual network. Each node displayed within the visual representation of the virtual network may be associated with one or more virtual machines 224 (where a virtual machine 224 may represent a network device in the physical network). The information may be displayed via a user interface on client device 230. The user, using the user interface, may analyze the virtual network. Client device 230 may store information regarding the virtual network and permit the user to analyze the virtual network at a later time.

While FIG. 4 is described with regard to generating a virtual network, VMM server 210 may generate multiple copies of the virtual network and may store the multiple copies of the virtual network. The user of client device 230 may analyze different copies of the virtual network using different methods. For example, the user may analyze one copy of the virtual network for correcting problems within the physical network and the user may analyze another copy of the virtual network to determine future growth requirements of the physical network.

While FIG. 4 shows process 400 as including a particular quantity and arrangement of blocks, in some implementations, process 400 may include fewer blocks, additional blocks, or a different order of blocks. Additionally, or alternatively, some of the blocks may be performed in parallel.

Figure 5:
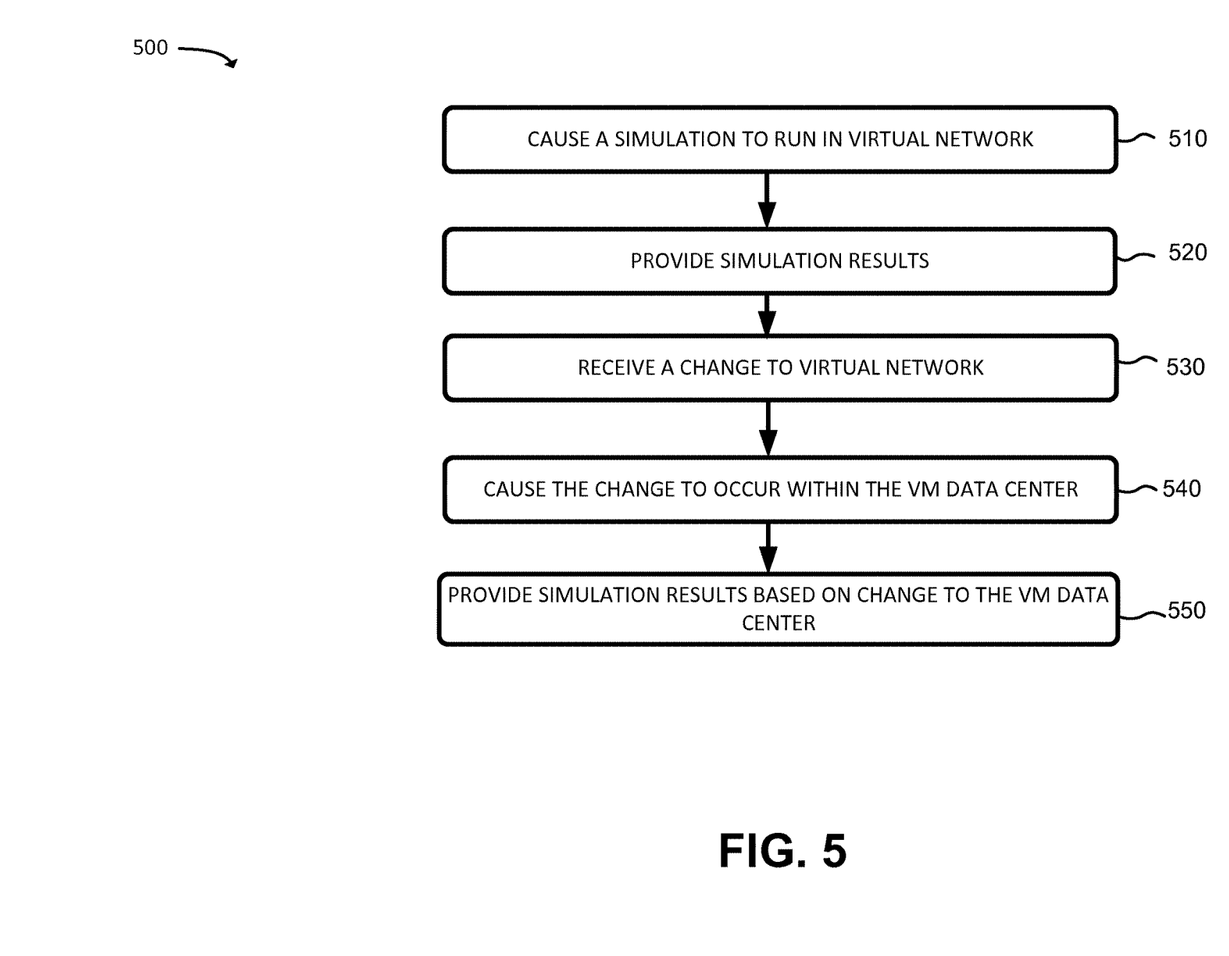
FIG. 5 is a flow chart of an example process for changing a virtual network.

FIG. 5 is a flow chart of an example process 500 for changing a virtual network. In one example implementation, process 500 may be performed by VMM server 210. In another example implementation, one or more blocks of process 500 may be performed by one or more other devices, such as client device 230 and/or VM server 222.

Process 500 may include causing a simulation to run (block 510). For example, VMM server 210 may receive an instruction from client device 230 (based on a request by a user of client device 230) to cause a simulation of a virtual network (such as a virtual network generated by VMM server 210, described with regard to FIG. 4) to run. VMM server 210 may instruct virtual machines 224, within the virtual network, to function in the same manner as network devices within a physical network. For example, network traffic (e.g., associated with the physical network) may be inserted into the virtual network.

For example, VMM server 210 may receive an instruction to run a simulation of the virtual network with the amount of network traffic that would occur within a particular period of time associated with the physical network. VMM server 210 may, via VM data center 220, send an instruction to virtual machine 224 to function as if virtual machine 224 is functioning as the network device during the particular time period.

Process 500 may include providing simulation results (block 520). For example, VMM server 210 may provide the simulation results to client device 230. The simulation results may be based on the instruction received from client device 230 (described with regard to block 510). The simulation results may include information regarding the rates of network traffic between different nodes in the virtual network, buffering issues associated with the network traffic, the amount of time associated with routing network traffic from one node to another node and/or other information relating to the operation of the virtual network.

Process 500 may include receiving a change to the virtual network (block 530). For example, VMM server 210 may receive a request from client device 230 to make a change to the virtual network. For example, the user, of client device 230, may decide to break a connection between one node and another node within the virtual network.

Process 500 may include causing the change within the VM data center (block 540). For example, VMM server 210 may send an instruction to VM data center 220 that results in a change in the operation of one or more virtual machines 224 that are associated with the virtual network. If, for example, the user requested to disconnect nodes within the virtual network, then VM data center 220 may send an instruction to one or more virtual machines 224 (in VM data center 220) to remove a connection between the two nodes based on the user's request.

Process 500 may include providing simulation results based on the change to the VM data center (block 550). For example, VMM server 210 may rerun the simulation (or continue the simulation) and may send the simulation results, based on the change to the nodes in the virtual network, to client device 230. The user, of client device 230, may view the simulation results (e.g., via a user interface displayed on client device 230). The simulation results may include a recommendation (to the user) regarding a change to the physical network.

While FIG. 5 shows process 500 as including a particular quantity and arrangement of blocks, in some implementations, process 500 may include fewer blocks, additional blocks, or a different order of blocks. Additionally, or alternatively, some of the blocks may be performed in parallel.

Figure 6:
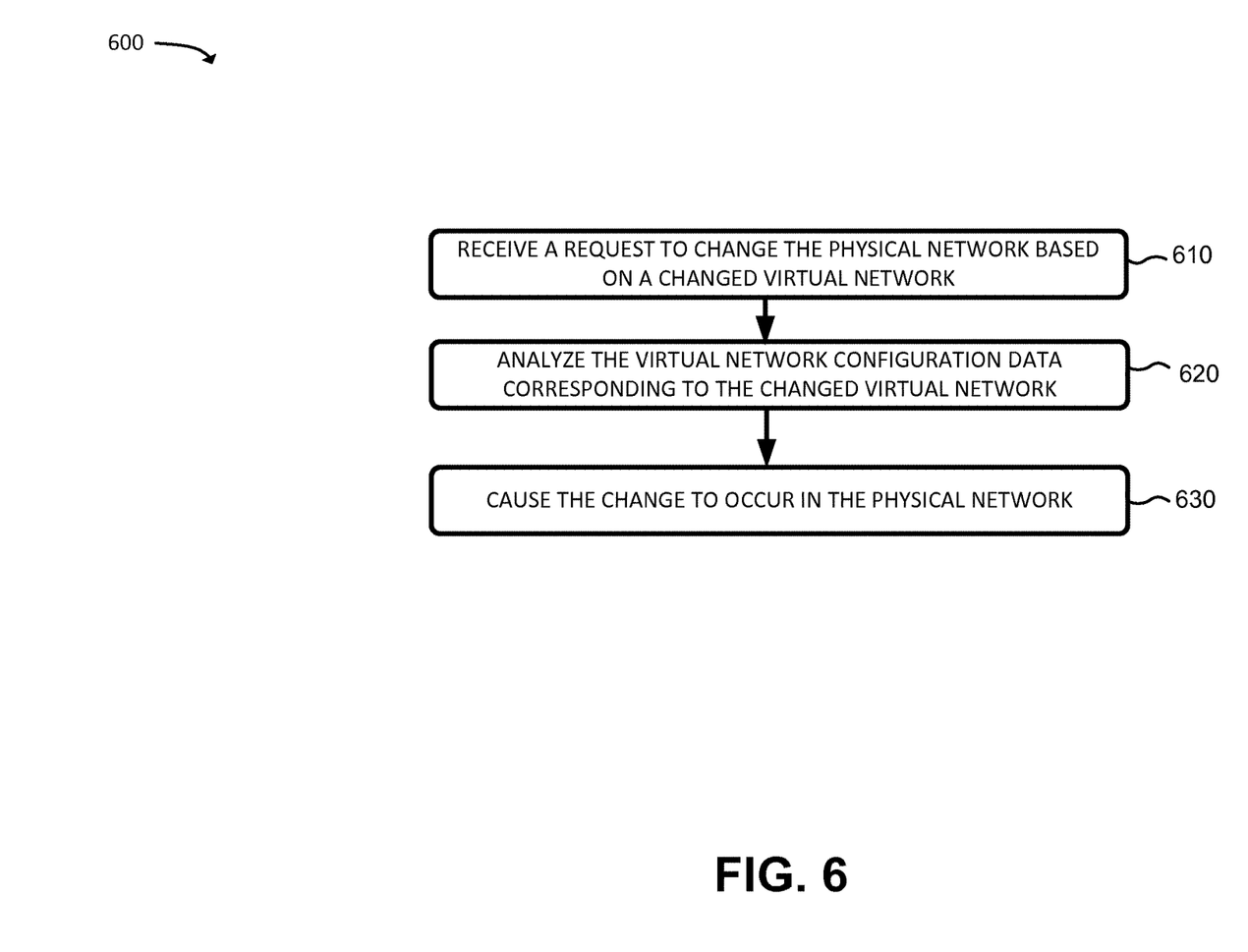
FIG. 6 is a flow chart of an example process for changing a physical network.

FIG. 6 is a flow chart of an example process 600 for changing a physical network. In one example implementation, process 600 may be performed by VMM server 210. In another example implementation, one or more blocks of process 600 may be performed by one or more other devices, such as client device 230 and/or VM server 222.

Process 600 may include receiving a request to change a physical network based on a changed virtual network (block 610). For example, VMM server 210 may receive a command from client device 230 to change a physical network. The command may be based on a user of user device 230 analyzing (using user device 230) a virtual network (which is a virtual representation of the physical network) and determining, based on the analysis of the virtual network, to change the physical network. The command may include an instruction to change the physical network based on changes made to the virtual network. For example, the change could be associated with changing a connection of a network device (in the physical network) to another network device. Alternatively, for example, the change could be associated with changing the IP address of a network device within the physical network. Alternatively, for example, the change could be associated with adding a network device to the physical network, or removing a network device from the physical network.

Process 600 may include analyzing the virtual network configuration data corresponding to the changed virtual network (block 620). For example, VMM server 210 may analyze the virtual network configuration data and change the virtual network configuration data based on the change in the virtual network. VMM server 210 may, for example, analyze the virtual network configuration data and determine a change to make to the physical network based on the virtual network configuration data.

Process 600 may include causing the change to occur in the physical network (block 630). For example, VMM server 210 may send an instruction to a network device in the physical network that may result in the change to the physical network.

In some implementations, VMM server 210 may send a command to the network device, via the network device's interface, and the network device may implement the command. For example, VMM server 210 may send a command to a router that the router is no longer to send network traffic to another router. The router may receive the command and may stop sending network traffic to the other router. Alternatively, for example, VMM server 210 may send a command to a router that the router is to no longer perform a particular service, such as a particular packet processing service.

In some implementations, VMM server 210 may send an updated configuration file to the network device. For example, VMM server 210 may change a routing protocol or a firewall protocol within a configuration file associated with a network. VMM server 210 may send the updated configuration file to the network device. The network device may receive the updated configuration file and may replace the configuration file, stored by the network device, with the updated configuration file.

In some implementations, VMM server 210 may communicate, with another server and/or device, to place an order for additional network devices based on the user changing the physical network to include additional network devices. The user, of client device 230, may monitor the status (using client device 230) of the order for the additional network devices.

While FIG. 6 shows process 600 as including a particular quantity and arrangement of blocks, in some implementations, process 600 may include fewer blocks, additional blocks, or a different order of blocks. Additionally, or alternatively, some of the blocks may be performed in parallel.

Figure 7A:
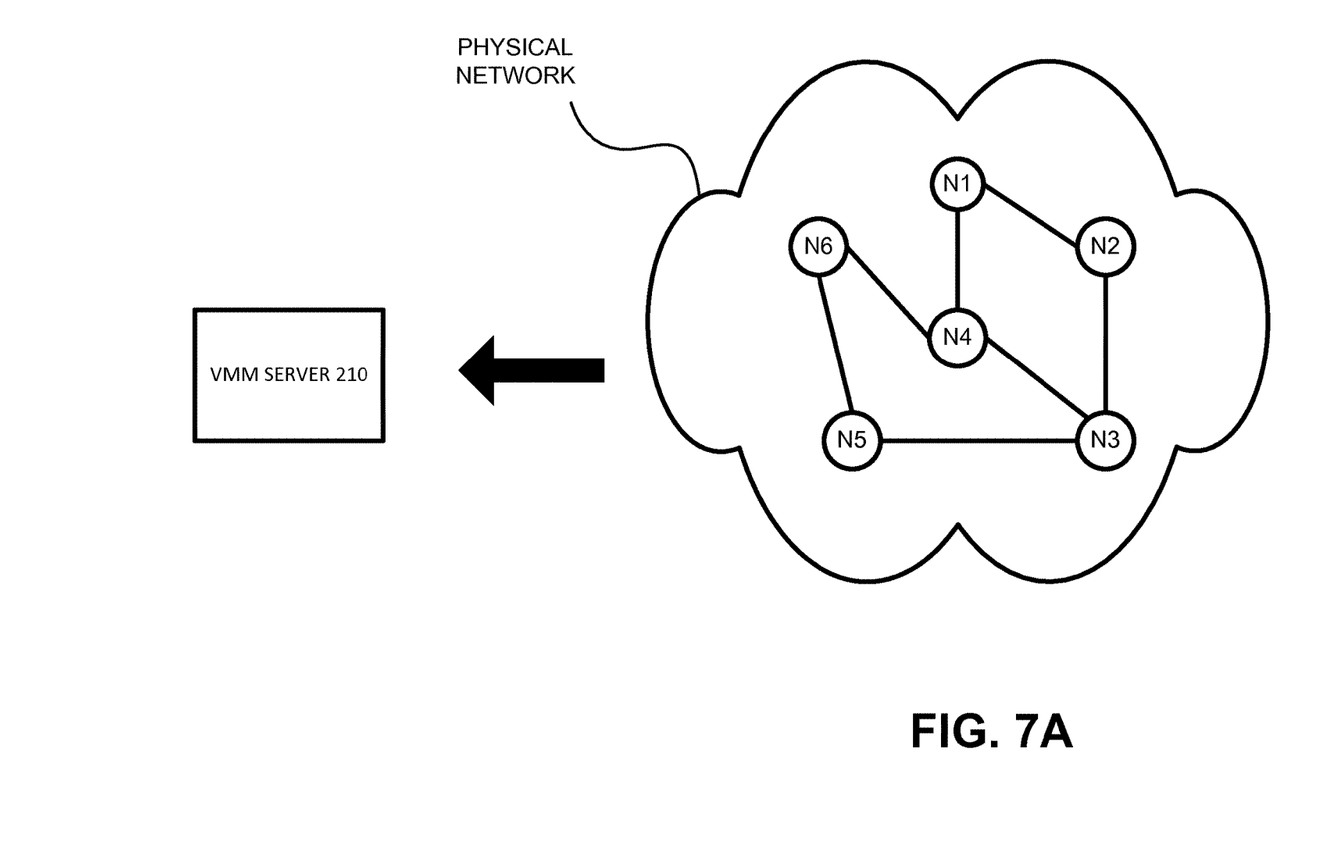
FIGS. 7A-7D are diagrams illustrating an example of a system and/or method described herein.

FIGS. 7A-7D are diagrams illustrating an example of a system and/or method described herein. As shown in FIG. 7A, VMM server 210 may receive information from a physical network. Assume that the physical network, as shown in FIG. 7A, has six network devices (shown as nodes N1-N6). Assume that each of the six network devices sends a respective configuration file to VMM server 210. VMM server 210 may receive the configuration files. Assume that each of the six network devices sends information (based on a request from client device 230) regarding its connectivity to other network devices. VMM server 210 may receive the connectivity information and create a topology file that describes the topology of the physical network. VMM server

210 may generate virtual network configuration data based on the configuration files and the topology file.

Figure 7B:
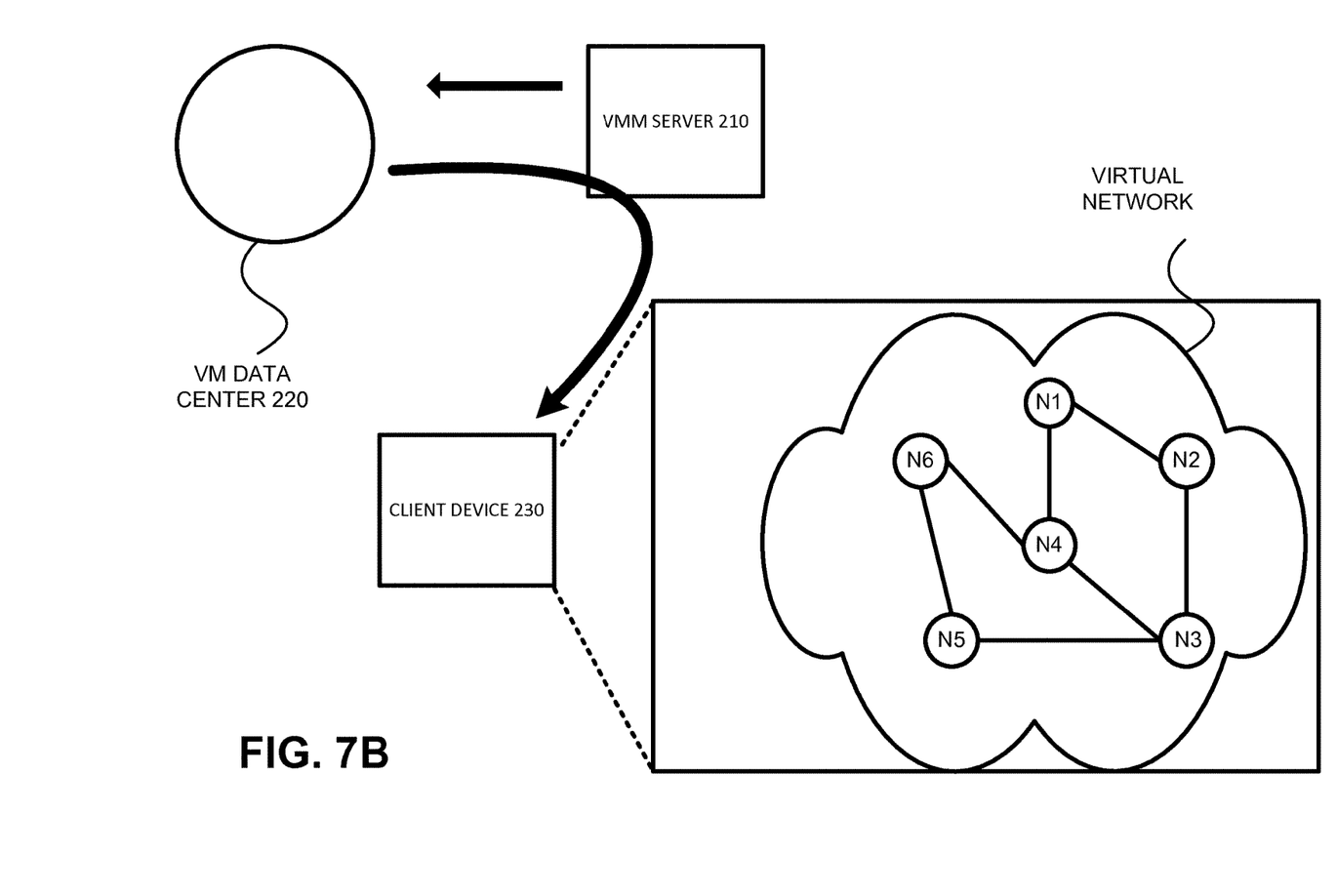

As shown in FIG. 7B, VMM server 210 may send the virtual network configuration data to VM data center 220. VM data center 220 may configure one or more virtual machines 224 with the virtual network configuration data. Assume that a virtual machine 224 may emulate a corresponding one of the network devices. VM data center 220 may send information regarding the configured virtual machines 224 to VMM server 210. The virtual machines may be configured to form a virtual network that corresponds to the physical network. VMM server 210 may send information, regarding the virtual network, to client device 230. Client device 230 may display a visual representation of the virtual network to a user of client device 230.

Figure 7C:
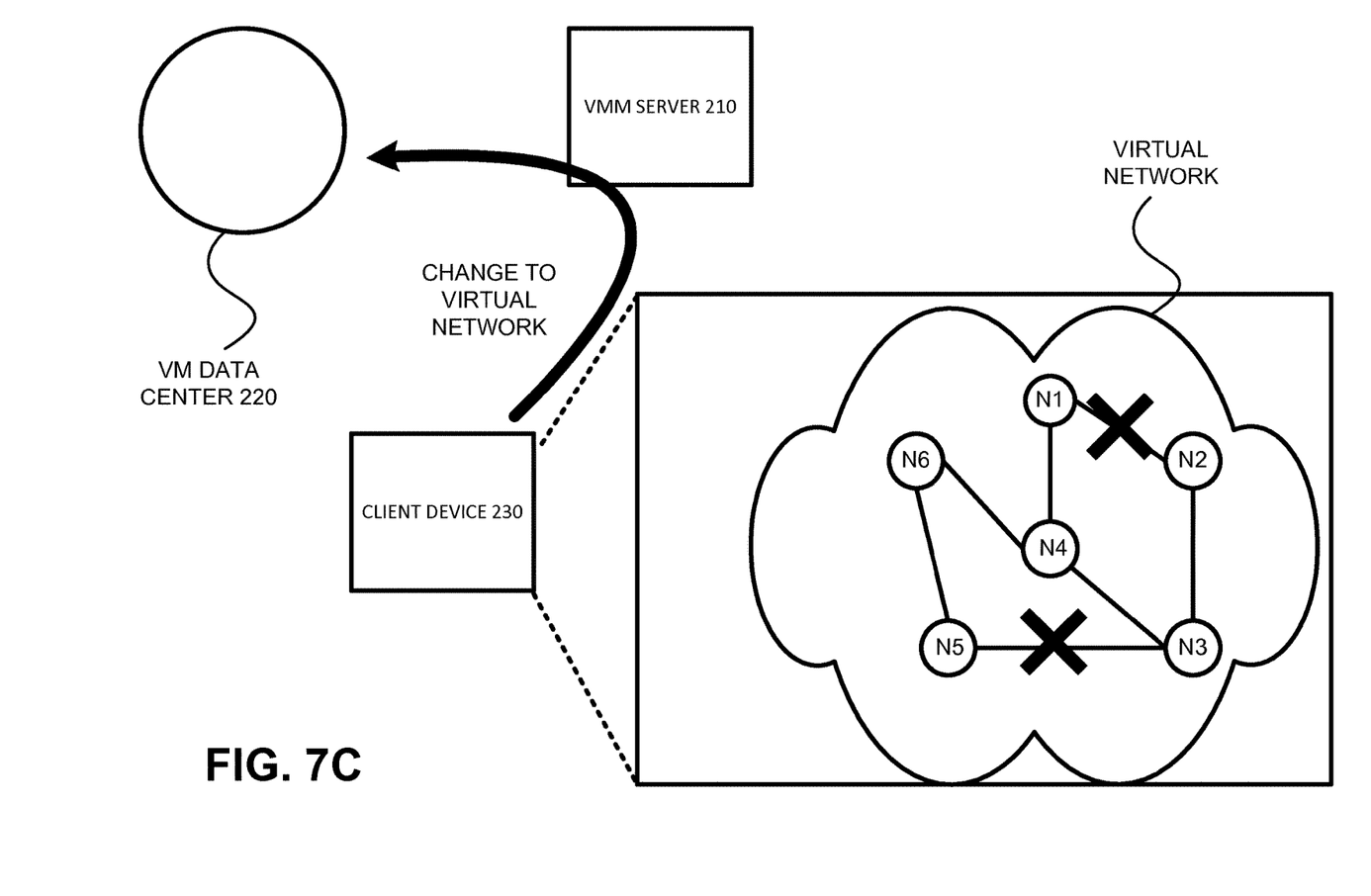
Figure 7D:
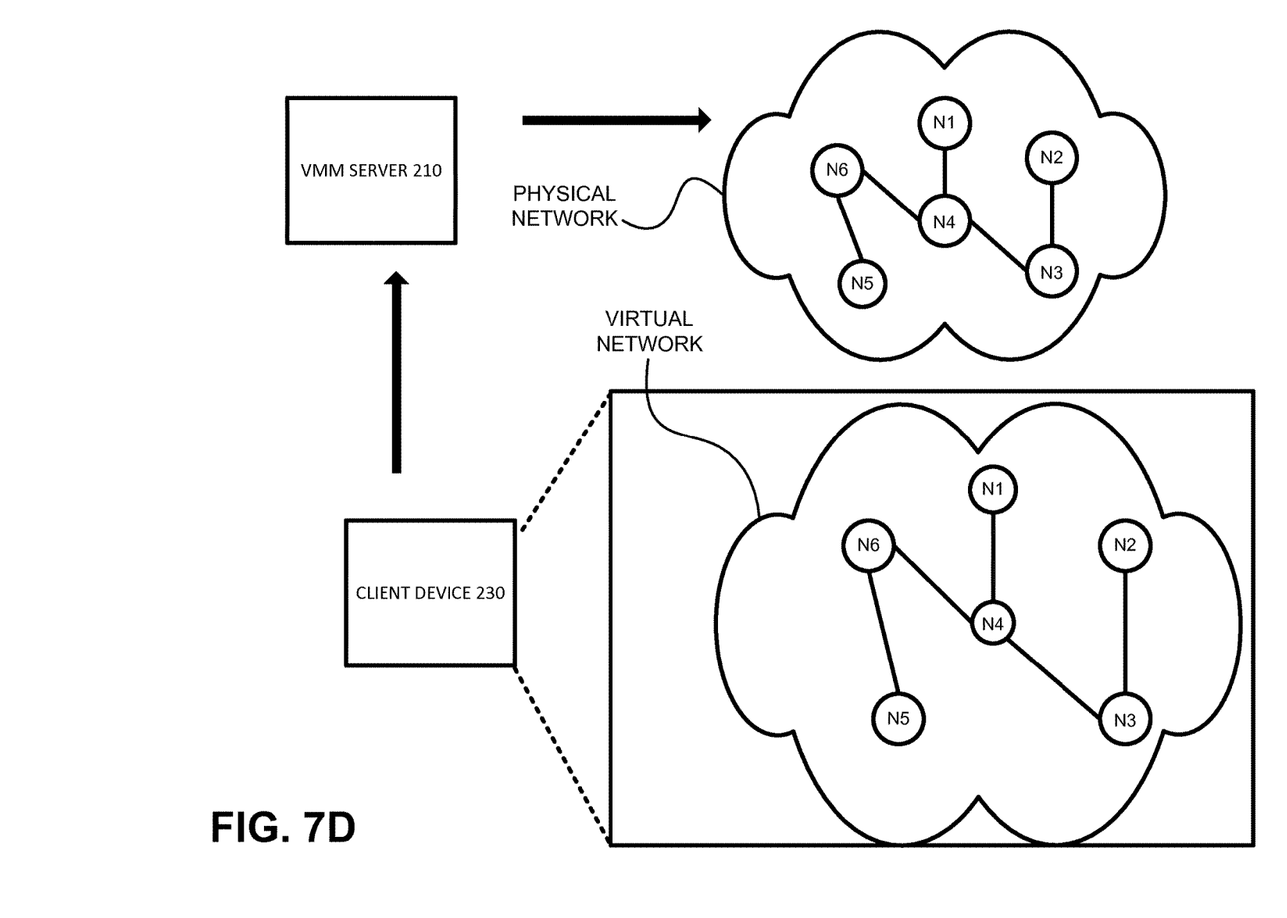

The user may decide to simulate operation of the physical network in the virtual network. As shown in FIG. 7C, the user may disconnect node N1 from node N2 and node N3 from node N5. Client device 230 may send a request to make the changes to the virtual network to VMM server 210. VMM server 210 may receive the changes and may send an instruction to VM data center 220. VM data center 220 may change virtual machines 224 to correspond to the changes made by the user. Thus, a virtual machine 224 associated with node N1 may disconnect from a virtual machine 224 associated with node N2. Based on the changes, client device 230 may receive information regarding a virtual network with the requested changes, as shown in FIG. 7D.

The user of client device 230 may determine, based on the changed virtual network, that the user would like to implement the same changes (as described above) to the physical network. The user, using client device 230, may send a command to VMM server 210 to make the changes to the physical network based on the same changes that were made to the virtual network. VMM server 210 may receive the command and send instructions to the physical network. The instructions may be sent to node N1 and node N3, instructing node N1 to disconnect from node N2 and instructing node N3 to disconnect from node N5.

Implementations, described herein, may provide a system and/or method for creating a virtual network, permitting changes to the virtual network, and determining how the changes may affect a virtual network (a virtual representation of the physical network within a computing environment) before implementing the changes within the physical network.

The foregoing description provides illustration and description, but is not intended to be exhaustive or to limit the implementations to the precise form disclosed. Modifications and variations are possible in light of the above disclosure or may be acquired from practice of the implementations.

It will be apparent that aspects described herein may be implemented in many different forms of software, firmware, and hardware in the implementations illustrated in the figures. The actual software code or specialized control hardware used to implement these aspects does not limit the implementations. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A device comprising:
a memory; and
one or more processors, coupled to the memory, to:
receive information regarding network devices associated with a physical network,
the information regarding the network devices including:
protocols associated with the network devices,
services associated with the network devices,
policies associated with the network devices,
interface types associated with the network devices,
connectivity information associated with the network devices, and
quality of service (QoS) information associated with the network devices;
generate virtual network configuration data based on the information regarding the network devices;
configure one or more virtual machines based on the virtual network configuration data,
the one or more virtual machines utilizing control plane software that is the same as control plane software utilized by the network devices;
initiate the one or more virtual machines by sending commands to the one or more virtual machines;
generate a virtual network based on initiating the one or more virtual machines,
the virtual network emulating the physical network, based on a particular amount of network traffic associated with the physical network during a particular period of time, by configuring the virtual network based on the particular amount of network traffic during the particular period of time;
send information regarding the virtual network to a client device,
the information regarding the virtual network including a visual representation of the virtual network, and
the visual representation including graphical information describing the virtual network;
receive a change to the virtual network from the client device,
the change being received based on an interaction, with the visual representation, received by the client device;
provide, to the client device, a simulation result associated with the change to virtual network,
the simulation result including a recommendation regarding a physical change, corresponding to the change to the virtual network, in the physical network; and
cause the physical change, corresponding to the change to the virtual network, to occur to the one or more of the network devices associated with the physical network.

2. The device of claim 1, where the one or more processors are further to:
configure a first virtual machine to perform functions associated with a first network device, the first network device being one of the network devices associated with the physical network;
configure a second virtual machine to perform functions associated with a second network device,
the second network device being another one of the network devices associated with the physical network; and
generate the virtual network based on configuring the first virtual machine and the second virtual machine,
the virtual network being formed using the first virtual machine and the second virtual machine.

3. The device of claim 1, where the one or more processors are further to:
configure a first virtual machine to perform a first function associated with a particular network device,
the particular network device being one of the network devices associated with the physical network;
configure a second virtual machine to perform a second function associated with the particular network device; and
generate the virtual network based on configuring the first virtual machine and the second virtual machine,
the virtual network being formed using the first virtual machine and the second virtual machine.

4. The device of claim 1, where the one or more processors are further to:
configure the one or more virtual machines based on the connectivity information; and
generate the virtual network based on configuring the one or more virtual machines,
the virtual network being formed using the one or more virtual machines.

5. The device of claim 1, where the one or more processors are further to:
receive topology information associated with the physical network and configuration information for the network devices,
the topology information identifying a topology of the physical network, and
the configuration information including configuration files associated with the network devices.

6. The device of claim 1, where the one or more processors are further to:
receive another change to the virtual network from the client device; and
cause another physical change, corresponding to the other change to the virtual network, to occur to the one or more of the network devices associated with the physical network.

7. The device of claim 6, where the other physical change includes removing a first network device from the physical network, or adding a second network device to the physical network.

8. A method comprising:
receiving, by a device, information regarding network devices associated with a physical network,
the information regarding the network devices including:
protocols associated with the network devices,
services associated with the network devices,
policies associated with the network devices,
interface types associated with the network devices,
connectivity information associated with the network devices, and
quality of service (QoS) information associated with the network devices;
generating, by the device, virtual network configuration data based on the information regarding the network devices;
configuring, by the device, a plurality of virtual machines, within a data center, based on the virtual network configuration data,
the plurality of virtual machines utilizing control plane software that is the same as control plane software utilized by the network devices;
initiating, by the device, the plurality of virtual machines by sending commands to the plurality of virtual machines;
generating, by the device, a virtual network based on initiating the plurality of virtual machines,
the virtual network emulating the physical network, based on a particular amount of network traffic associated with the physical network during a particular period of time, by configuring the virtual network based on the particular amount of network traffic during the particular period of time;
sending, by the device, information regarding the virtual network to a client device,
the information regarding the virtual network including graphical information describing the virtual network;
receiving, by the device, a change to the virtual network from the client device,
the change being received based on one or more changes, to the graphical information, received by the client device;
causing, by the device, the change to occur within the data center;
providing, by the device and to the client device, a simulation result associated with causing the change to occur within the data center,
the simulation result including a recommendation regarding a physical change, corresponding to the change to the virtual network, in the physical network; and
causing, by the device, the physical change, corresponding to the change to the virtual network, to occur to one or more of the network devices associated with the physical network based on providing the simulation result.

9. The method of claim 8, further comprising:
causing a plurality of physical changes to occur to a plurality of the network devices associated with the physical network.

10. The method of claim 8, further comprising:
modifying a topology of the physical network based on the physical change.

11. The method of claim 8, further comprising:
receiving a particular change to the virtual network from the client device; and
causing another physical change, corresponding to the particular change to the virtual network, to occur to the one or more of the network devices associated with the physical network,
the other physical change including causing a routing protocol or a firewall protocol, associated with the physical network, to change.

12. The method of claim 8, where generating the virtual network configuration data includes:
generating the virtual network configuration data based on configuration file information, regarding the network devices associated with the physical network, and based on topology information of the physical network.

13. The method of claim 8, further comprising:
configuring the plurality of virtual machines based on the connectivity information; and
generating the virtual network based on configuring the plurality of virtual machines.

14. A non-transitory computer-readable medium storing instructions, the instructions comprising:
one or more instructions that, when executed by one or more processors of one or more devices, cause the one or more processors to:
receive information regarding network devices associated with a physical network,
the information regarding the network devices including:
protocols associated with the network devices,
services associated with the network devices,
policies associated with the network devices,
interface types associated with the network devices,
connectivity information associated with the network devices, and
quality of service (QoS) information associated with the network devices;
generate virtual network configuration data based on the information regarding the network devices;
configure one or more virtual machines based on the virtual network configuration data,
the one or more virtual machines utilizing control plane software that is the same as control plane software utilized by the network devices;
initiate the one or more virtual machines by sending commands to the one or more virtual machines;
generate a virtual network based on initiating the one or more virtual machines,
the virtual network emulating the physical network, based on a particular amount of network traffic associated with the physical network during a particular period of time, by configuring the virtual network based on the particular amount of network traffic during the particular period of time;
send information regarding the virtual network to a client device,
the information regarding the virtual network including graphical information describing the virtual network;
receive a change to the virtual network from the client device,
the change being received based on the client device receiving a modification to a connections, of the graphical information, between the network devices;
provide, to the client device, a simulation result associated with the change to the virtual network,
the simulation result including a recommendation regarding a physical change, corresponding to the change to the virtual network, in the physical network; and
permit the physical change, corresponding to the change to the virtual network, to occur to the one or more of the network devices associated with the physical network.

15. The non-transitory computer-readable medium of claim 14, where the instructions further comprise:
one or more instructions that, when executed by the one or more processors, cause the one or more processors to:
configure a first virtual machine, of the one or more virtual machines, and a second virtual machine, of the one or more virtual machines, to perform functions associated with a first network device,
the first network device being one of the network devices associated with physical network; and
generate the virtual network using the first virtual machine and the second virtual machine.

16. The non-transitory computer-readable medium of claim 14, where the instructions further comprise:
one or more instructions that, when executed by the one or more processors, cause the one or more processors to:
configure a first virtual machine, of the one or more virtual machines, to perform a first function associated with a particular network device,
the particular network device being one of the network devices associated with the physical network;
configure a second virtual machine, of the one or more virtual machines, to perform a second function associated with the particular network device; and
generate the virtual network based on the first virtual machine and the second virtual machine.

17. The non-transitory computer-readable medium of claim 14, where the instructions further comprise:
one or more instructions that, when executed by the one or more processors, cause the one or more processors to:
receive information regarding configuration information for the network devices; and
receive topology information associated with the physical network.

18. The non-transitory computer-readable medium of claim 14, where the instructions further comprise:
one or more instructions that, when executed by the one or more processors, cause the one or more processors to:
receive another change to the virtual network; and
cause another physical change, corresponding to the other change to the virtual network, to occur to the one or more of the network devices associated with the physical network.

19. The non-transitory computer-readable medium of claim 18, where the other physical change includes removing a first network device, from the physical network, or adding a second network device to the physical network.

20. The non-transitory computer-readable medium of claim 14, where the instructions further comprise:
one or more instructions that, when executed by the one or more processors, cause the one or more processors to:
receive another change to the virtual network,
the other change being a modification of a topology of the virtual network; and
cause another physical change, corresponding to the other change to the virtual network, to occur to the one or more of the network devices associated with the physical network.

* * * * *